United States Patent [19]

Koyanagi

[11] Patent Number: 4,699,506
[45] Date of Patent: Oct. 13, 1987

[54] CONJUGATE LENGTH VARYING DEVICE

[75] Inventor: Yoshihiro Koyanagi, Kanagawa, Japan

[73] Assignee: Fuji Photo Film Co., Ltd., Kanagawa, Japan

[21] Appl. No.: 878,915

[22] Filed: Jun. 26, 1986

[30] Foreign Application Priority Data

Jun. 27, 1985 [JP] Japan .................................. 60-138982

[51] Int. Cl.⁴ .............................................. G03B 27/72
[52] U.S. Cl. ........................................ 355/71; 354/159
[58] Field of Search ........................ 355/64, 72, 74, 71; 354/159, 161, 210

[56] References Cited

U.S. PATENT DOCUMENTS 4,591,251 5/1986 Fisher ................................ 355/72 X Primary Examiner—Richard A. Wintercorn
Attorney, Agent, or Firm—Sughrue, Mion, Zinn, Macpeak and Seas

[57] ABSTRACT

In a printer which uses a lens in its exposure system to transfer an image formed on a negative film or a cathode ray tube onto a printing medium, a conjugate length varying device including a projecting stand on which a paper mask is detachably mounted and a plurality of paper masks different in height from one another. The paper masks are selectively mounted on the projecting stand to change the conjugate length thereby to change the print size.

5 Claims, 5 Drawing Figures

CONJUGATE LENGTH VARYING DEVICE

BACKGROUND OF THE INVENTION

1. Field of the Invention

This invention relates to a printer with a lens in its exposure system, and more particularly to a conjugate length varying device for altering the print size.

1. Background Art

A printer often uses a lens in its exposure system to transfer an image framed on a negative film or on a CRT (cathode ray tube) onto a color print paper. In this case, if it is required to change the print size on the print paper, two methods are generally employed.

In one of the methods, a plurality of lenses having different focal lengths from one another are provided in the exposure system. The lenses are selectively used according to the size of an image be formed on the color paper. For instance, these lenses are arranged on a turret type lens mount, and when it is required to change the print size, the lens mount is turned so that one of the plurality of lenses is selected for the new print size and this lens is set in the optical path.

In the other method, a single lens is employed in the exposure system, and the lens conjugate length is controlled to change the print size. That is, in order to change the print size, the printer easel and the lens are moved along the direction of the optical axis so as to change the conjugate length between the negative film or the CRT and the projection surface of the color paper.

However, the first method is disadvantageous in the following points. Since it is necessary to provide a plurality of lenses in the exposing system, an apparatus for practicing the method is unavoidably high in manufacturing cost. Furthermore, since the apparatus needs the turret type lens mount for selectively using the lenses, the apparatus is necessarily intricate in construction, which also increases the manufacturing cost of the apparatus.

The second method also suffers from difficulties. Namely, it is necessary to provide means for moving the printer easel up and down so that an apparatus for practicing the method is also intricate in construction and high in manufacturing cost.

SUMMARY OF THE INVENTION

Accordingly, an object of this invention is to eliminate the above-described difficulties accompanying a conventional print size changing method.

The foregoing object and other objects of the invention have been achieved by the provision of a conjugate length varying device for a printer which uses a lens in the exposing system to transfer an image formed on a negative film or a cathode ray tube onto a color print paper. According to the invention, the apparatus includes a projecting stand on which a paper mask is detachably mounted and a plurality of paper masks different in height from one another for separately providing conjugate lengths according to print sizes.

When it is required to change the print size in the printer, the paper mask is removed from the projecting stand and a paper mask predetermined for the desired print size is mounted on the projecting stand. Under this condition, the lens is moved along the exposed optical path to a predetermined position to change the conjugate length between the surface of the image to be transferred and the projection surface, to thereby change the magnification of the image on the projection surface, i.e., to change the print size. The plurality of paper masks are provided for the plurality of print sizes, respectively, so that the print sizes are determined by the paper masks.

The nature, principle and utility of the invention will become more apparent from the following detailed description when read in conjunction with the accompanying drawings.

DETAILED DESCRIPTION OF THE EMBODIMENTS

Preferred embodiments of the invention will be described with reference to the accompanying drawings.

Figure 1:
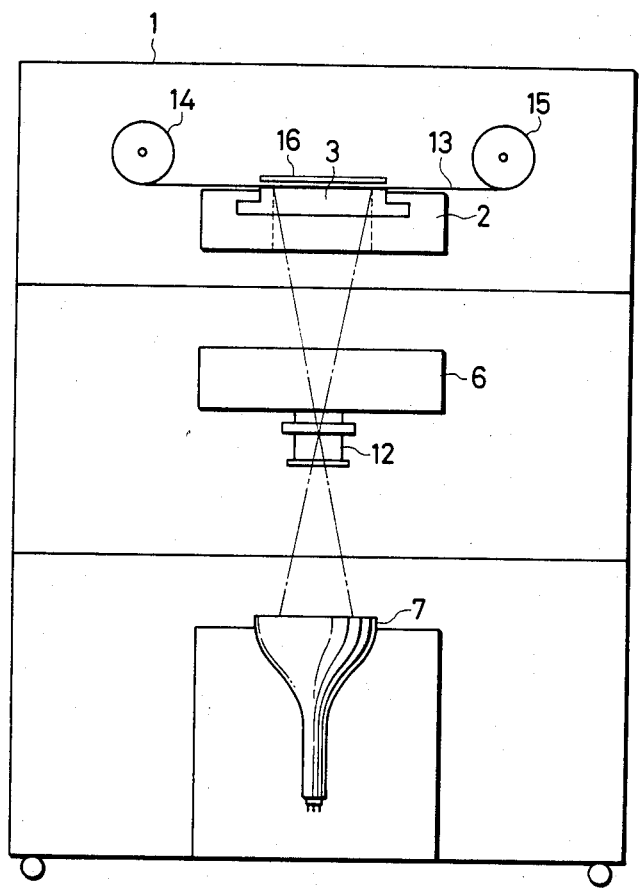
FIG. 1 is an explanatory diagram showing a printer with a conjugate length varying device according to this invention.
Figure 2:
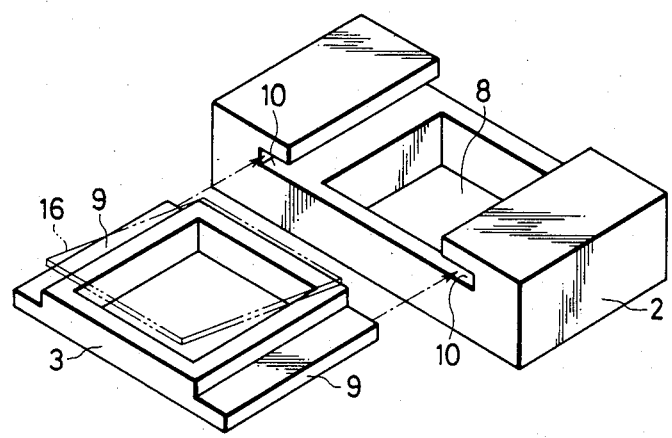
FIG. 2 is a perspective view showing a projecting stand and a paper mask which from the conjugate length varying device according to the invention.

FIG. 1 shows a printer which employs a lens 12 in the exposure system to transfer an image on a CRT (cathode ray tube) 7 onto a color print paper 13. The printer further comprises a lens mount 6 including the lens 12 for transferring the image on the CRT 7 onto the color paper 13 and a projecting stand 2. The CRT 7 receives video signals to form images on its screen. The lens mount 6 has a shutter and a filter on the exposing optical path. The lens 12 is provided below the lens mount 6 in such a manner that it is movable along the optical exposure path. A paper mask 3 is held in contact with the color paper 13 on the projecting stand 2. The paper mask 3 is better illustrated in perspective in FIG. 2. The paper mask 3 is replaced by another one when the printing size is changed. The color paper 13 is fed by means of feed rollers 14 and 15. A pressure plate 16 is provided to hold the color paper 13 in plate.

For instance, in the case where an image 105 mm × 140 mm on the screen of the CRT 7 is transferred through the lens 12 of a focus length of 140 mm onto the color paper 13 so that an image of L-size, i.e., 85.2 mm × 113.5 mm, is formed thereon, the distance between the screen of the CRT 7 and the lens 12 is 312.6 mm and the distance between the lens 12 and the projection surface of the color paper 13 is 253.5 mm. Therefore the conjugate length is 566.1 mm. In the case where it is required to use the same lens 12 to change the projection size into E-size, i.e., 78.3 mm × 104.4 mm, it is necessary to change the distance between the screen of the CRT 7 and the lens 12 to 327.7 mm and the distance between the lens 12 and the projection surface of the color paper 13 to 244.4 mm. Accordingly, it is necessary to move the lens 12 by a distance 15.1 mm towards the projection surface of the color paper 13. The lens mount 6 may be motor driven by, for instance, a screw mechanism, or may be manually movable to predetermined positions by, for instance, spring loaded pins engaging one of a series of vertically arranged holes. However, this movement also increases the conjugate length by 6.0 mm. In this case, the variation of the conjugate length with the variation of the print size is relatively small. Therefore, if the paper mask 3 on the projecting stand is replaced by one different in height, then the conjugate length can be changed and the print size can be changed while still maintaining focus. For this purpose, a recess for slidably receiving the paper mask 3 from the side of the paper feeding direction is formed in the upper part of the projecting stand 2 which has an opening 8 for the exposing optical path at the center. The recess thus formed has grooves 10 at both ends of the paper mask inserting direction, and the paper mask 3 has protrusions 9 at both ends in the paper mask inserting direction. Therefore, the paper mask 3 can be fixedly secured to the projecting stand 2 by inserting its protrusions 9 into the grooves 10.

Figure 3:
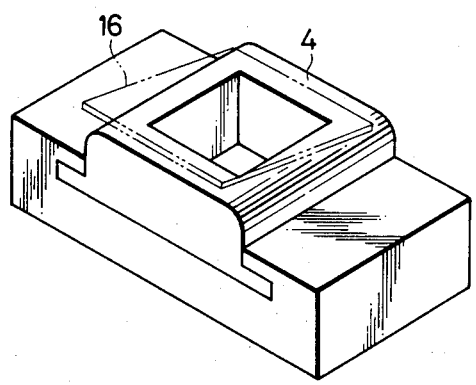
FIG. 3 is a perspective view showing another example of the paper mask combined with the projecting stand in the device of the invention.

When it is required to change the print size, a predetermined paper mask 4 different in height as well as size of the central aperture is engaged with the projecting stand 2, as shown in FIG. 3, and the lens 12 is adjusted to change the conjugate length thereby to change the print size.

When the first paper mask 3 is replaced by the second paper mask 4 which is greater in height than the first paper mask 3, the ends of the color paper contact surface of the higher second paper mask 4 may scratch the color paper 13. However, this difficulty can be eliminated by the following method. The ends of the surface of the paper mask 4 which contacts the color paper are rounded. Alternatively, a paper mask 5, as shown in FIG. 4, is employed which has freely rotating rollers 11 within recesses at its edges.

Figure 5:
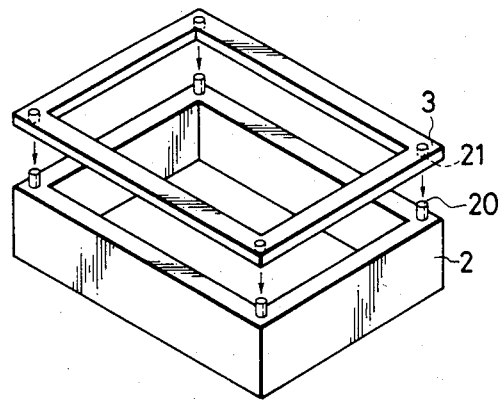

FIG. 5 shows another embodiment of this invention. In this first embodiment described above, the paper mask 3 is slidably inserted into the projecting stand 2. On the other hand, in the second embodiment, as shown in FIG. 5, the projecting stand 2 has pin-shaped protrusions 20, and the paper mask 3 has holes 21 which are engaged with respective ones of the protrusions 20, so that the paper mask 3 is fixedly mounted on the projecting stand 2.

Figure 4:
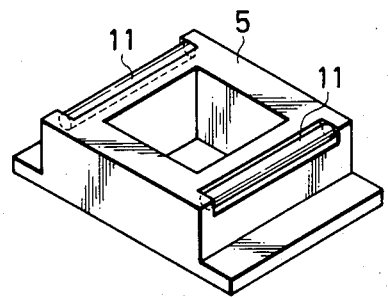
FIGS. 4 and 5 are perspective view showing other examples of the paper mask in the device of the invention.

In each of FIGS. 4 and 5, a pressure plate 16 for fixedly holding the paper in place is not shown for simplification in illustration.

The conjugate length varying device of the invention is effective in changing the print size as described above. The device is applicable not only to a printer for transferring images on the CRT onto the recording medium but also to a conventional printer for printing images by using negative films.

In the conjugate length varying device of the invention, unlike the conventional one, it is unnecessary to use a plurality of exposure lenses for changing the print size, and it is also unnecessary to move the whole easel. Accordingly, the conjugate length varying device provided by the invention is low in manufacturing cost and can readily change the print size.

What is claimed is:

1. A variable size image recording device, comprising:
   (a) a planar image source (7);
   (b) a projecting stand (2) having an opening;
   (c) a lens (12) having an optical axis aligned with and being movable along an axis between said image source and said opening of said projecting stand;
   (d) a plurality of masks (3) individually and selectively detachably mountable on said projecting stand over said opening and opposite said lens, said masks having different thicknesses measured along said optical axis such that different conjugate lengths may be established to enable different sized image recordings; and
   (e) a recording medium (13) disposed in engagement with a principal surface of a selected one of said masks opposite said lens.

2. A recording device as recited in claim 1, wherein at least one of said masks has two rounded edges on opposite sides of said principal surface.

3. A recording device as recited in claim 1, wherein at least one of said masks has two rollers (11) individually disposed at opposite edges of said principal surface.

4. A recording device as recited in claim 1, further comprising a pressure plate (16) for pressing said recording medium against said principal surface of said selected mask mounted in said projecting stand.

5. A recording device as recited in claim 1, wherein said plurality of masks have central apertures differing in size from one another.

* * * * *